(12) United States Patent
Williams, Jr.

(10) Patent No.: US 8,733,780 B2
(45) Date of Patent: May 27, 2014

(54) QUICK RELEASE TELESCOPING AND SWIVELING HITCH ASSEMBLY

(75) Inventor: Thomas M. Williams, Jr., Durham, NC (US)

(73) Assignee: TeleSwivel, LLC, Durham, NC (US)

( * ) Notice: Subject to any disclaimer, the term of this patent is extended or adjusted under 35 U.S.C. 154(b) by 776 days.

(21) Appl. No.: 12/495,222

(22) Filed: Jun. 30, 2009

(65) Prior Publication Data
US 2009/0322059 A1 Dec. 31, 2009

Related U.S. Application Data

(63) Continuation of application No. 11/608,676, filed on Dec. 8, 2006, now Pat. No. 7,552,938.

(60) Provisional application No. 60/597,559, filed on Dec. 9, 2005.

(51) Int. Cl.
| | | |
|---|---|---|
| *B60D 1/40* | (2006.01) |
| *B60D 1/24* | (2006.01) |
| *B60D 1/155* | (2006.01) |
| *B60D 1/26* | (2006.01) |
| *B60D 1/28* | (2006.01) |

(52) U.S. Cl.
CPC ............... *B60D 1/245* (2013.01); *B60D 1/155* (2013.01); *B60D 1/26* (2013.01); *B60D 1/28* (2013.01)
USPC ....................... 280/479.3; 280/477; 280/491.2

(58) Field of Classification Search
CPC .......... B60D 1/155; B60D 1/246; B60D 1/26; B60D 1/28
USPC ............. 280/479.3, 478.1, 477, 479.1, 479.2, 280/480, 480.1, 491.2, 494
See application file for complete search history.

(56) References Cited

U.S. PATENT DOCUMENTS

| | | |
|---|---|---|
| 2,451,660 A | 10/1948 | Clark et al. |
| 2,973,971 A | 3/1961 | Oddson |
| 2,988,383 A | 6/1961 | Carson |
| 3,057,644 A | 10/1962 | Fisher |
| 3,093,395 A | 6/1963 | Boutwell |
| 3,140,881 A | 7/1964 | Antici |
| 3,169,028 A | 2/1965 | Scrivner |
| 3,169,782 A | 2/1965 | Columbus |
| 3,207,530 A | 9/1965 | Paun |
| 3,243,202 A | 3/1966 | Carson |
| 3,279,825 A | 10/1966 | Boutwell |
| 3,410,577 A | 11/1968 | Luinstra |
| 3,612,576 A | 10/1971 | Marler |
| 3,881,748 A | 5/1975 | Donaldson |
| 3,912,119 A | 10/1975 | Hill et al. |
| 3,929,237 A | 12/1975 | Schaedler |

(Continued)

*Primary Examiner* — Tony H. Winner
*Assistant Examiner* — Jacob Knutson
(74) *Attorney, Agent, or Firm* — Myers Bigel Sibley & Sajovec, P.A.

(57) ABSTRACT

A quick release assembly for remotely actuating operative disconnection between vehicles by decoupling a hitch assembly having a telescopic and swiveling probe assembly carried in a housing assembly and mounted on the towed vehicle. In one embodiment, the release assembly includes an actuator remotely controlled from the towing vehicle that releases the components retaining the probe assembly in the housing. In another embodiment, an actuator remotely controlled from the towing vehicle decouples the entire hitch assembly from the associated vehicle. In both instances, the towing vehicle may resume movement clear of the towing vehicle. Thereafter, the probe assembly and/or the hitch assembly may be recoupled for subsequent use.

13 Claims, 4 Drawing Sheets

(56) References Cited

U.S. PATENT DOCUMENTS

| | | |
|---|---|---|
| 4,134,602 A | 1/1979 | Boger |
| 4,265,465 A | 5/1981 | Deitrich, Sr. |
| 4,269,428 A | 5/1981 | Rexine |
| 4,515,387 A | 5/1985 | Schuck |
| 4,603,878 A | 8/1986 | Smith, Jr. |
| 4,650,207 A | 3/1987 | Ackermann |
| 4,807,899 A | 2/1989 | Belcher |
| 4,861,061 A | 8/1989 | Frantz |
| 4,893,829 A | 1/1990 | Davis |
| 4,913,451 A | 4/1990 | Woodall |
| 4,944,525 A | 7/1990 | Landry |
| 4,951,957 A | 8/1990 | Gullickson |
| 4,976,453 A | 12/1990 | Kaplan |
| 4,991,865 A | 2/1991 | Francisco |
| 5,009,446 A | 4/1991 | Davis |
| 5,067,742 A | 11/1991 | Relja |
| 5,188,385 A | 2/1993 | Wilson |
| 5,201,539 A | 4/1993 | Mayfield |
| 5,213,354 A | 5/1993 | Vaughn |
| 5,236,214 A | 8/1993 | Taylor |
| 5,277,447 A | 1/1994 | Blaser |
| 5,288,095 A | 2/1994 | Swindall |
| 5,288,096 A | 2/1994 | Degelman |
| 5,322,315 A | 6/1994 | Carsten |
| 5,342,076 A | 8/1994 | Swindall |
| 5,503,423 A | 4/1996 | Roberts et al. |
| 5,547,210 A | 8/1996 | Dugger |
| 5,580,088 A | 12/1996 | Griffith |
| 5,593,171 A | 1/1997 | Shields |
| 5,636,885 A | 6/1997 | Hummel |
| 5,890,617 A | 4/1999 | Rowland et al. |
| 5,992,871 A | 11/1999 | Rowland et al. |
| 6,047,982 A * | 4/2000 | McClure et al. ............ 280/515 |
| 6,068,281 A | 5/2000 | Szczypski |
| 6,170,852 B1 | 1/2001 | Kimbrough |
| 6,364,337 B1 | 4/2002 | Rowland et al. |
| 6,494,477 B1 * | 12/2002 | Parker ................... 280/479.1 |
| 6,634,666 B2 | 10/2003 | Shilitz et al. |
| 6,749,213 B2 | 6/2004 | Kollath et al. |
| 6,758,485 B1 | 7/2004 | Voelker et al. |
| 6,863,294 B1 * | 3/2005 | Bonham ................. 280/479.2 |
| 6,889,994 B1 | 5/2005 | Birkenbaugh |
| 7,007,967 B2 | 3/2006 | Goettker |
| 7,097,193 B1 | 8/2006 | Sievert |
| 7,134,679 B2 | 11/2006 | Krstovic |
| 7,290,755 B1 * | 11/2007 | Thibodeaux ................ 254/323 |
| 7,293,791 B1 | 11/2007 | Williams, Jr. |
| 7,338,062 B1 | 3/2008 | Violette et al. |
| 7,425,014 B1 | 9/2008 | Palmer |
| 7,461,855 B2 | 12/2008 | Klar |
| 7,669,876 B2 | 3/2010 | Kerpash, Sr. |
| 2007/0080516 A1 | 4/2007 | Simmons |

* cited by examiner

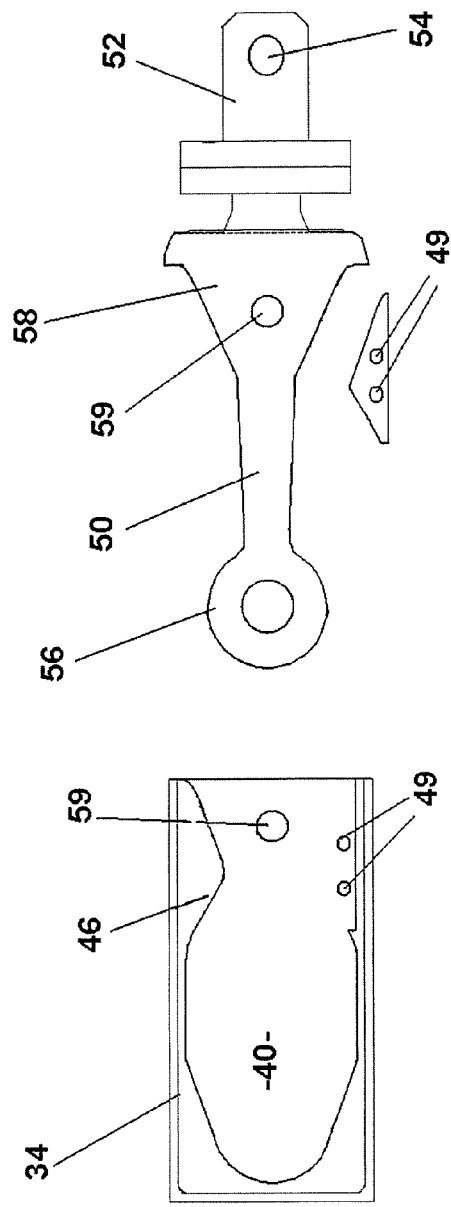
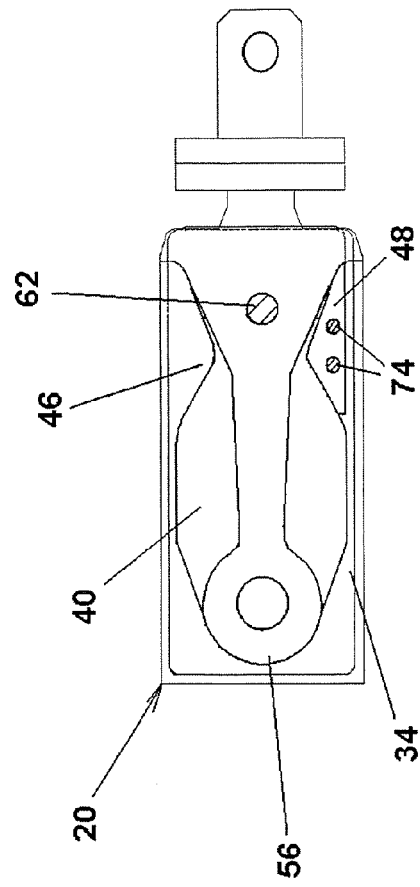
FIG. 5
FIG. 4

QUICK RELEASE TELESCOPING AND SWIVELING HITCH ASSEMBLY

RELATED APPLICATION

This application is a continuation application of U.S. Patent application Ser. No. 11/608,676, filed Dec. 8, 2006 now U.S. Pat. No. 7,552,938, which claims the benefit of U.S. Provisional Application No. 60/597,559 filed on Dec. 9, 2005, both of which are incorporated herein by reference in their entireties.

FIELD OF THE INVENTION

The present invention relates to apparatus for releasably interconnecting a towing vehicle with a towed vehicle and, in particular, a remotely controlled system for releasing a telescoping and swiveling hitch assembly from hitched vehicles.

BACKGROUND OF THE INVENTION

In my co-pending application U.S. Ser. No. 10/908,514 filed May 16, 2005 there is disclosed telescoping and swiveling hitch assembly for interconnecting towing and towed vehicles. This application is hereby incorporated by reference. The hitch assembly may be mounted on either the towed or towing vehicle and allows remote releasable coupling between proximately located vehicle using a telescoping and pivoting probe assembly.

The hitch assembly is particularly suitable for heavy vehicle applications that may be readily deployed for final coupling by rough relative positioning of the vehicles. The hitch assembly comprises only two unitized subassemblies, a housing assembly and a tow bar or probe assembly. Under certain circumstances, the towed vehicle may become abruptly disabled, requiring immediate decoupling to enable the towing vehicle to resume operation or go to other situations.

SUMMARY OF THE INVENTION

The present invention provides a quick release hitch for decoupling the hitch assembly from the vehicles. In one aspect, a system is provided for decoupling the probe assembly from the housing to allow separation of the vehicles. In another aspect, the hitch assembly is decoupled from its vehicle. For probe assembly separation, an actuator remotely controlled from the towing vehicle releases the components retaining the probe assembly in the housing. For hitch assembly separation, an actuator remotely controlled from the towing vehicle decouples the entire hitch assembly from the associated vehicle. In both instances, the towing vehicle may resume movement clear of the towing vehicle. Thereafter, the probe assembly and/or the hitch assembly may be recoupled for subsequent use.

BRIEF DESCRIPTION OF THE DRAWINGS

The above and other features of the invention will become apparent upon reading the following description, taken in conjunction with the accompanying drawings in which:

FIG. 4 is a cross sectional view showing the housing assembly and the probe assembly in the locked coupled condition; and FIG. 5 is a cross sectional view of the housing assembly and the probe assembly in the unlocked decoupled condition.

DESCRIPTION OF THE PREFERRED EMBODIMENTS

Figure 1:
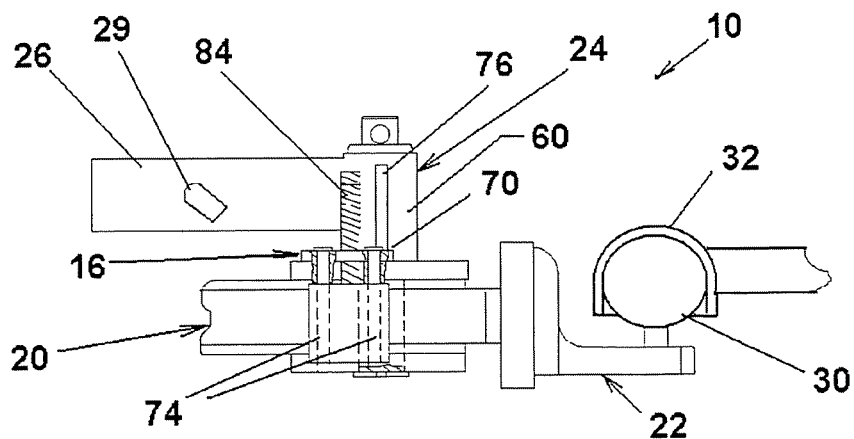
FIG. 1 is a side view of quick release telescoping and swiveling hitch assembly coupled between a towing vehicle and a towed vehicle.
Figure 2:
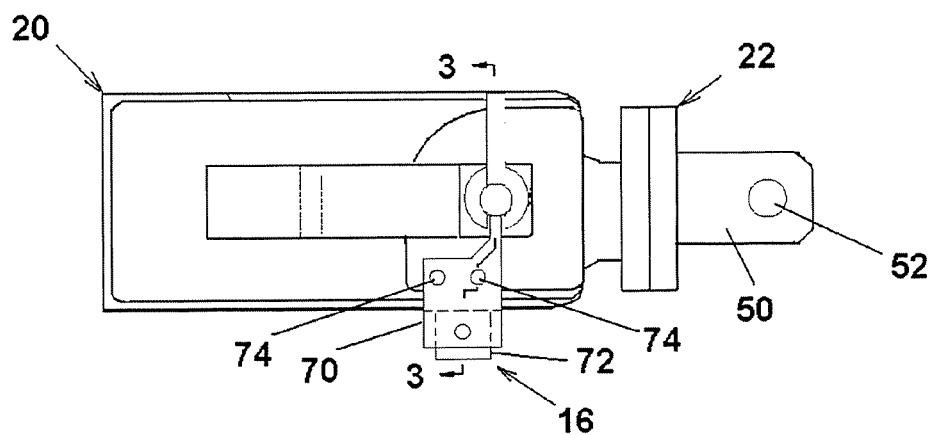
FIG. 2 is a top view of the hitch assembly of FIG. 1.
Figure 3:
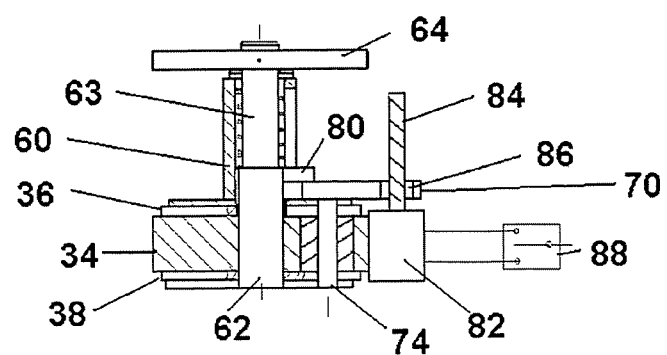
FIG. 3 is a view taken along line 3-3 of FIG. 2.
Figure 6:
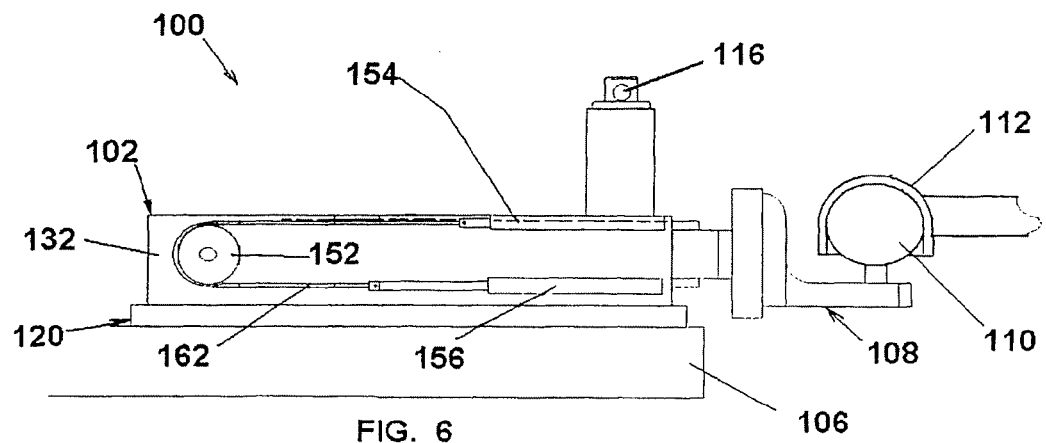
FIG. 6 is a side view of a quick release telescoping and swiveling hitch assembly in accordance with another embodiment of the invention.
Figure 7:
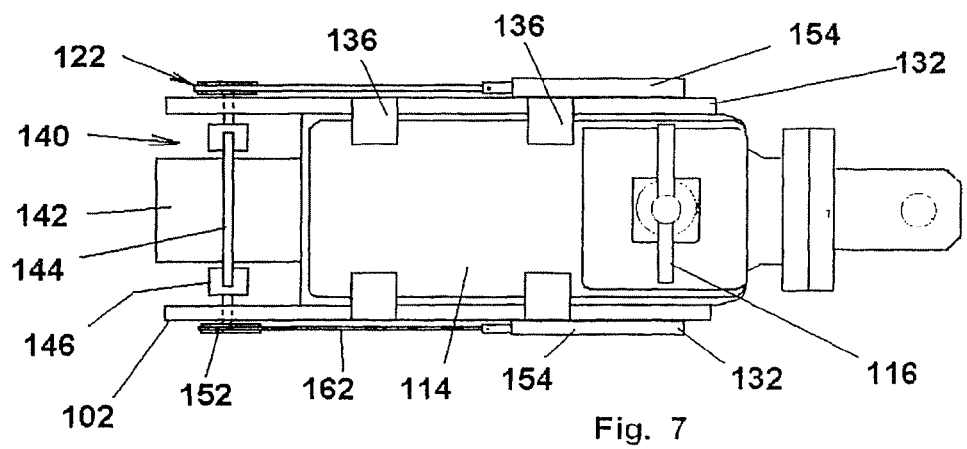
FIG. 7 is a top view of the hitch assembly of FIG. 6.
Figure 8:
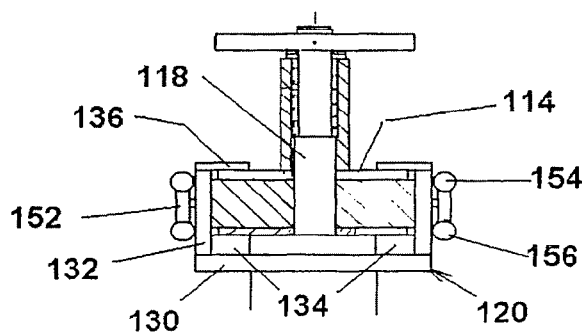
FIG. 8 is a cross sectional view taken along line 8-8 in FIG. 2.
Figure 9:
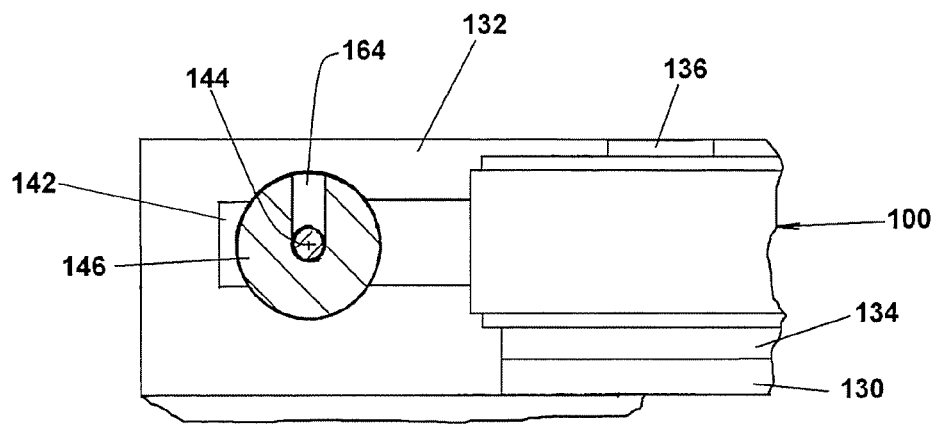
FIG. 9 is a view taken along line 9-9 in FIG. 6 showing the lock wheel in the locked position.

Referring to FIGS. 1 through 5, the present invention provides a telescoping and swiveling hitch assembly 10 for interconnecting a towing vehicle or truck with a towed vehicle or trailer that is provided with a quick release assembly 16 for decoupling the vehicles from a remote location.

The hitch assembly 10 as shown is carried on the towing vehicle and connected to the towed vehicle. The hitch assembly may also be carried on the towed vehicle and connected to the towing vehicle as described in greater detail in the above referenced patent application and reference thereto should be made for further details. The hitch assemblies of the present type are particularly adapted for heavy-duty vehicles, such as military transport systems. The hitch assembly may be combined with conventional coupling configurations, such a ball and socket or ball and lunette couplings, for accommodating relative articulating movement between the vehicles. The hitch assembly 10 may be integrated in various ways with the desired vehicle, for example by mechanical or welded attachment at the rear.

The hitch assembly 10 comprises two subassemblies: a housing assembly 20 and a telescoping and swiveling tow bar or probe assembly 22.

The housing assembly 20 includes a lock assembly 24 having a rearwardly extending coupling arm 26 formed of rectangular tube. The coupling arm 26 is telescopically removably coupled with a hitch box, not shown on the towing vehicle by pin 29 inserted through transverse hole in the coupling arm. The hitch box is preferably a rectangular socket-type coupled commonly referred to a "Reese" hitch. The probe assembly 22 is provided with a ball member 30 for coupling with a conventional hitch on the towed vehicle. As such, no further modification to the vehicle is necessary. It will, however, be apparent that the hitch may be mounted by other conventional methods to the selected vehicle.

The lock assembly 24 in the unlatched condition provides the probe assembly 22 with free horizontal and pivotal movement, which in combination with the pivoting of the trailer tongue on the towed vehicle permits the ready and safe coupling therebetween.

As shown in FIGS. 4 and 5, the housing assembly 20 comprises a rectangular center guide block 34, a rectangular top cover plate 36 and a rectangular bottom cover plate 38. Preferably, the plates are peripherally welded to the guide block to provide a unitized assembly. A top reinforcing plate is welded to the top cover plate at the forward end thereof. A bottom reinforcing plate is welded to the bottom cover plate at the forward end thereof.

The guide block 34 comprises unitary body having a base and forwardly extending laterally spaced arms. The inner surfaces of the base and the arms provide a generally U-shaped forwardly opening slot forming a cavity 40 in assembly. The cavity is defined by a continuous inner wall comprising a U-shaped, forwardly opening parabolic base wall and laterally spaced center walls. The arms frontally terminate with a pair of laterally spaced, apex opposed triangular collars 46, and 48. Collar 48 is removable in the disconnect condition described below. The inner tips of the triangular collars establish a constricted frontal throat. The collars have outwardly diverging planar front guide surfaces and rear guide surfaces. The front guide surfaces form, in assembly, a forwardly opening wedge shaped, tapered socket. Vertical through holes 49 are drilled through the housing assembly 20 and the stop collar 48.

The probe assembly 22 comprises an elongated tow bar 50 welded at an outer end to a face plate that is connected to a hitch eyelet. The hitch eyelet terminates with a horizontally projecting arm 52 having an aperture 54 for receiving the shank for the ball member 30. The tow bar 50 includes straight rectangular center section narrower in width than the throat in the guide block having an enlarged circular tail section 56 at the rear end and an enlarged generally triangular head section 58 at the front end. When the tow bar 50 is in the fully retracted position, the tail section 56 engages the base wall of the guide block and nests thereat. When the tow bar is in the fully extended position, the tail section 56 engages the rear guide surfaces of the collars 46, 48 to establish a load bearing pivotal connection with the housing assembly as described in the referenced patent application.

The head section 58 includes rearwardly inwardly inclined sidewalls forming a tapered wedge adapted to nest with the front guide walls in the guide block socket to center the probe assembly at the retracted position. A through hole 59 is formed in the base for permitting movement of the lock assembly between locked and unlocked positions, between positions, as described below.

The lock assembly 24 includes a vertical lock block 60 attached to the top plate 36 and connected to the coupling arm 26 at an upper end. The lock block 60 has a vertical bore aligned with aperture 59 in the tow bar and corresponding apertures in the plates 36, 38. A cylindrical lock pin or bolt 62 is slidably supported in the bore. The lock bolt includes a reduced diameter shaft 63 at an upper end. A transverse actuating handle 64 is attached the upper end of the shaft 63. A compression spring is carried on the shaft and compressively retained between the lock bolt and a retaining cap at the upper end of the lock block. Accordingly, the lock bolt 62 is compressively biased to the locked position shown in FIG. 3 wherein the lock bolt passes through the hole 59 in the tow arm 50. The handle is raised against the biasing of the spring to an unlocked position whereat the probe assembly may be extended. Thereafter, the lock bolt 62 rides against the top surface of the tow bar 50 until aligned with the tow bar aperture for automatic self biasing to the locked position.

In operation, the towing vehicle is backed proximate the hitch of the towed vehicle. The actuating handle is raised to the unlocked position and the tow bar 50 manually extended, and aligned with and coupled in a conventional manner with the towed vehicle. Thereafter if a considerable misalignment between the vehicles exists, the towing vehicle may be moved forwardly to longitudinally align the tow bar at the pivotal connection between the collars 46, 48 and the tail section 56. Then the vehicle is reversed causing the tow bar tail 56 to engage the rearwardly converging surfaces of the base wall for further alignment and the head to nest in the front housing socket thereby achieving an aligned position whereat the lock assembly 24 shift to the locked condition.

In situations wherein it is necessary to establish a quick disconnect between the vehicles, the quick release assembly 16 remotely enables operative separation of the vehicles at the hitch assembly. The release assembly 16 comprises a latching plate 70 that is moved between a latched condition and an unlatched condition by a linear actuator 72 mounted on the housing assembly. The latching plate 70 includes a pair of lock pins 74 that extend through the apertures in the removable collar 48 in the latched condition and are removed therefrom in the unlatched condition. The lock block includes a vertical slot 76. An actuating tab 80 extends through the slot 76 and is attached at an inner end to the shaft on the lock bolt. The outer end of the tab 80 overlies the inner end of the latching plate 70. Accordingly the lock assembly may operate independent of the release assembly for coupling and decoupling the vehicles as described above.

The linear actuator 72 includes a motor 82 having an output shaft with an actuating screw 84 coupled to a drive nut 86 attached to the latching plate. The motor 82 is actuated by a two position switch 88 preferably located in the towing vehicle.

In operation wherein it is desired to uncouple remotely the towing vehicle from the towed vehicle, the operator closes the switch 88 thereby moving the latching plate 70 and accordingly the lock pins 74 upwardly from the removable collar 48, and engaging the tab 80 to move the lock pin 62 from the probe assembly. Thereafter forward movement of the towing vehicle withdraws the probe assembly 22 and the removable collar 48 from the housing separating the operative connection between the vehicles.

Another embodiment of the invention is shown in FIGS. 6 through 10. Therein, rather than separating the components of the hitch assembly, the hitch assembly itself is decoupled from the associated vehicle and is particularly suited for larger commercial and military applications. Referring to in FIGS. 6-8, the hitch assembly 100 is releasably carried on a quick release assembly 102, which in turn, is mounted on the tongue 106 of the trailing vehicle.

The probe assembly 108 of the hitch assembly 100 is provided with a ball member 10 for coupling with a corresponding hitch component 112 on the towing vehicle. As in the first embodiment, the hitch assembly and release assembly may be carried on the towing vehicle.

The hitch assembly 100 comprises a housing assembly 14 and the probe assembly 108 as described above and provided with a latching handle 116 for raising a lock pin 18 to unlatch the probe assembly for telescopic and swiveling movement for hitching with the towing vehicle.

The coupling assembly 102 comprises a base assembly 120 horizontally slidably supporting the hitch assembly 100 and a rotating coupling assembly 122 for latching the hitch assembly on the base assembly in a locked position and unlatching the hitch assembly in an unlocked position.

The base assembly 120 includes a base plate 130 having a pair of laterally spaced side plates 132. The inner surfaces of the side plates 132 are spaced to have a sliding fit with the side of the housing 114. A pair of slide rails 134 are attached to the upper surface of the base plate 130 and have an upper surface slidably engaging the bottom surface of the housing assembly. A pair of inwardly extending brackets 136 are longitudinally spaced on the top of the side plates 132 and have lower surfaces slidably engaging the upper surface of the housing. Accordingly the base assembly provides a horizontal slot supporting the hitch assembly for telescopic forward and outward movement when the release assembly is actuated as described below.

The quick release assembly includes a rotatable assembly 140 for selectively locking and releasing the housing. The assembly 140 includes a rear bracket 142 attached at the rear of the housing carrying a transverse lock pin 144, which is captured and released by rotatable lock wheel 146 bidirectionally rotated by actuator assemblies carried on the side plate. Each actuator assembly comprises a sprocket 152 having a shaft to which the lock wheel 146 is attached, and a pair of linear actuators 154, 156 mounted on the side plates and having output pistons connected to the ends of a drive belt or chain 162 operatively connected with the sprocket 152. The actuators 154, 156 are operated in phase opposition for bidirectionally rotating the lock wheels between a coupled locked position shown in FIG. 9 and a decoupled unlocked position shown in FIG. 10. The lock wheels 146 comprise circular discs, each having a radially outwardly opening slot 164 with a semicircular base for receiving the lock pin 142. In the coupled position of FIG. 9, the slot 164 is positioned upwardly whereby the sides of the slot restrain the housing from horizontal movement. As the actuator assembly is actuated, the pistons extend and retract to rotate the lock wheel to a position whereat the slot 146 is horizontally frontally opening and the housing assembly is free to move forwardly in the support slot for decoupling from the trailing vehicle. Preferably, the rotation is about 900 as illustrated.

Figure 10:
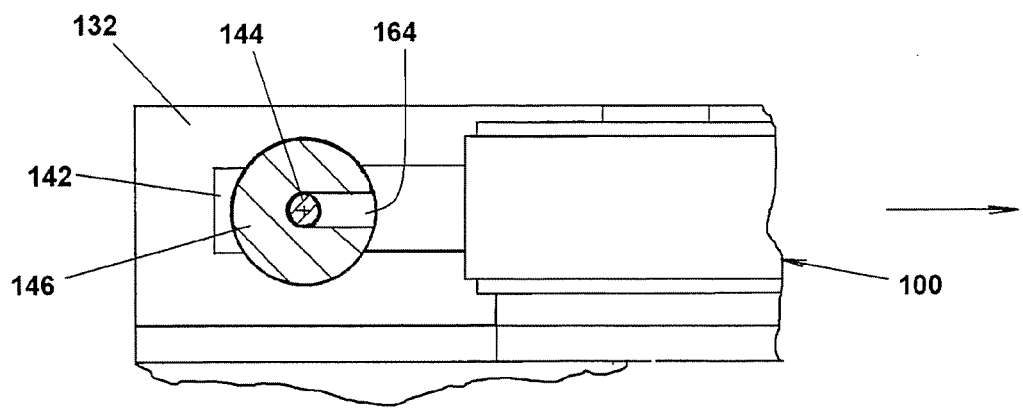
FIG. 10 is a view of the lock wheel of FIG. 9 in the unlocked position.
Figure 11:
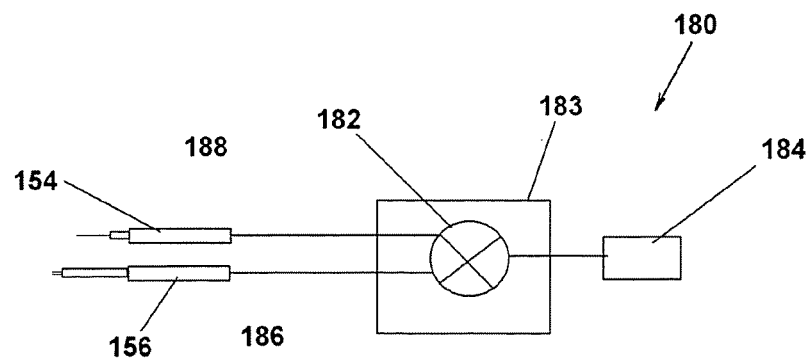
FIG. 11 is a schematic view of the control system for the quick release assembly.

Referring to FIG. 10, the control system 180 for the coupling assembly is disposed in the towing vehicle for use by the operator to achieve remotely hitch decoupling. The control system 180 includes a valve 182 in the vehicle cab 183 having an inlet connected to the vehicle air supply 184, if pneumatic actuators are used, or the electrical system if electromechanical actuators are used. The valve 182 has one outlet connected in parallel with the lower actuators by branch line 186 and another outlet connected in parallel with the upper actuators by branch line 188. For locking the release assembly with the hitch assembled in the coupling position, the lower actuators are actuated by the valve and the upper actuators vented whereby the lock wheels are rotated from the unlocked position of FIG. 9 to the locked position of FIG. 10. When it is desired to decouple the hitch, the valve 182 is moved to the opposite position whereby the lock wheels 146 are rotated from the locked position to the unlocked position allowing the lock pin to move forwardly in the lock wheel slot 164 and the hitch assembly 100 to separate upon forward movement of the towing vehicle. Thereafter, the hitch assembly may be recoupled for subsequent use.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A hitch assembly for towing vehicles, comprising:
a probe assembly;
a housing assembly configured to receive the probe assembly therewithin;
a lock assembly operably associated with the housing assembly that releasably locks the probe assembly within the housing assembly, wherein the lock assembly is movable between locked and unlocked positions;
an actuator operably associated with the lock assembly that, when activated, moves the lock assembly from a locked position to an unlocked position such that the probe assembly can be released from the housing assembly; and
a device remotely located relative to the actuator for activating the actuator.

2. The hitch assembly of claim 1, wherein the device is located within a towing vehicle.

3. The hitch assembly of claim 1, wherein the device is located within a cab of a towing vehicle.

4. The hitch assembly of claim 1, wherein the device comprises an electrical switch.

5. The hitch assembly of claim 1, wherein the actuator is a pneumatic actuator.

6. The hitch assembly of claim 1, wherein the actuator is an electromechanical actuator.

7. The hitch assembly of claim 1, wherein the lock assembly comprises a lock block having a bore, and a lock pin slidably supported within the lock block bore.

8. The hitch assembly of claim 7, wherein the lock block bore is substantially vertical.

9. The hitch assembly of claim 7, further comprising a spring configured to urge the lock pin toward a locked position.

10. The hitch assembly of claim 7, wherein the actuator comprises a motor having an output shaft operably coupled to a latching plate, wherein rotation of the output shaft causes the latching plate to move the lock pin from a locked position to an unlocked position.

11. A hitch assembly for towing vehicles, comprising:
a probe assembly;
a housing assembly configured to receive the probe assembly therewithin;
a lock assembly operably associated with the housing assembly that releasably locks the probe assembly within the housing assembly, wherein the lock assembly comprises a lock block having a bore, and a lock pin slidably supported within the lock block bore and movable between locked and unlocked positions;
a motor having an output shaft operably coupled to a latching plate, wherein rotation of the output shaft causes the latching plate to move the lock pin from a locked position to an unlocked position such that the probe assembly can be released from the housing assembly; and
an electrical switch remotely located with a cab of a towing vehicle for activating the motor.

12. The hitch assembly of claim 11, further comprising a spring configured to urge the lock pin toward the locked position.

13. The hitch assembly of claim 11, wherein the lock block bore is substantially vertical.

* * * * *